United States Patent [19]

Gross et al.

[11] Patent Number: 5,743,944
[45] Date of Patent: Apr. 28, 1998

[54] FLUID CLATHRATE SYSTEM FOR CONTINUOUS REMOVAL OF HEAVY NOBLE GASES FROM MIXTURES OF LIGHTER GASES

[75] Inventors: Kenneth C. Gross, Bolingbrook; Francis Markun, Joliet, both of Ill.; Mary T. Zawadzki, South Bend, Ind.

[73] Assignee: University of Chicago, Chicago, Ill.

[21] Appl. No.: 540,715

[22] Filed: Oct. 11, 1995

Related U.S. Application Data

[63] Continuation-in-part of Ser. No. 192,141, Feb. 4, 1994, abandoned.

[51] Int. Cl.[6] .................................................. B01D 47/02
[52] U.S. Cl. .......................... 96/181; 55/220; 55/228; 55/256; 55/257.7; 95/180; 95/185; 95/230
[58] Field of Search ........................... 55/220, 227, 228, 55/256, 257.1, 257.7, 270; 95/149, 156, 178, 179, 180, 185, 186, 187, 226, 230, 260; 96/181, 218

[56] References Cited

U.S. PATENT DOCUMENTS

| | | | |
|---|---|---|---|
| 1,456,570 | 5/1923 | Reed | 96/181 |
| 1,934,029 | 11/1933 | Asbury | 95/180 |
| 2,296,992 | 9/1942 | Gary | 95/180 |
| 2,423,238 | 7/1947 | Hoover | 95/180 |
| 3,214,890 | 11/1965 | Sterrett | 95/180 |
| 3,236,029 | 2/1966 | Afdahl et al. | 96/181 |
| 3,665,677 | 5/1972 | Koch | 96/181 |
| 3,742,720 | 7/1973 | Ferguson et al. | 95/230 |
| 3,887,339 | 6/1975 | Robertson | 95/230 |
| 4,028,072 | 6/1977 | Braun et al. | 96/181 |
| 4,115,081 | 9/1978 | Ohno et al. | 95/230 |
| 4,129,425 | 12/1978 | Stephenson et al. | 95/230 |
| 4,305,735 | 12/1981 | Kanak et al. | 95/230 |
| 4,371,383 | 2/1983 | Rost . | |
| 4,400,183 | 8/1983 | Henrich et al. | 95/180 |
| 4,756,724 | 7/1988 | Yuill . | |
| 4,798,034 | 1/1989 | Jarnagin et al. | 52/169.5 |
| 4,801,800 | 1/1989 | Scheible | 250/255 |
| 4,844,715 | 7/1989 | Henrich et al. | 95/180 |
| 4,858,521 | 8/1989 | Heh . | |
| 4,863,493 | 9/1989 | Kotani et al. | 55/228 |
| 4,869,832 | 9/1989 | Lamarre | 210/747 |

(List continued on next page.)

FOREIGN PATENT DOCUMENTS 52-14975  2/1977  Japan .

OTHER PUBLICATIONS

"Recovery of Fission Product Noble Gases", Industrial and Engineering Chemistry Journal, Meyer Steinberg and Bernard Manowitz, vol. 51, No. 1, Jan. 1959, pp. 47–50.

"Radon Solubility in Fatty Acids and Triglycerides", E. Nussbaum and John B. Hursh, Jul. 19, 1957, pp. 81–84.

"Random Risk Factors", Thomas J. Bierna, Journal of Enviromental Health, May/Jun. 1989, pp. 277–281.

"Indoor Radon," William W. Nazaroff & Kevin Teichman, Environ. Sci. Technol., vol. 24, No. 6, 1990, pp. 774–782.

"Radon In the Home," Brian Glach, Colorado Engineer, Summer 89, pp. 14–15.

Primary Examiner—C. Scott Bushey
Attorney, Agent, or Firm—Foley & Lardner; Michael D. Rechtin

[57] ABSTRACT

An apparatus and method for separation of heavy noble gas in a gas volume. An apparatus and method have been devised which includes a reservoir containing an oil exhibiting a clathrate effect for heavy noble gases with a reservoir input port and the reservoir is designed to enable the input gas volume to bubble through the oil with the heavy noble gas being absorbed by the oil exhibiting a clathrate effect. The gas having reduced amounts of heavy noble gas is output from the oil reservoir, and the oil having absorbed heavy noble gas can be treated by mechanical agitation and/or heating to desorb the heavy noble gas for analysis and/or containment and allow recycling of the oil to the reservoir.

20 Claims, 3 Drawing Sheets

U.S. PATENT DOCUMENTS

| | | | |
|---|---|---|---|
| 4,885,984 | 12/1989 | Franceus . | |
| 4,915,020 | 4/1990 | Dumbeck . | |
| 4,917,716 | 4/1990 | Schmid et al. | 62/20 |
| 4,938,124 | 7/1990 | Garza . | |
| 4,957,394 | 9/1990 | Jarnagin et al. | 405/128 |
| 5,083,500 | 1/1992 | Francis et al. | 454/341 |
| 5,100,555 | 3/1992 | Matson | 210/651 |
| 5,104,554 | 4/1992 | Dempsey | 210/747 |
| 5,106,759 | 4/1992 | Addison | 436/178 |
| 5,149,343 | 9/1992 | Sowinski . | |
| 5,186,903 | 2/1993 | Cornwell | 422/122 |
| 5,191,874 | 3/1993 | McWilliams | 126/312 |
| 5,194,158 | 3/1993 | Matson | 210/651 |
| 5,198,000 | 3/1993 | Grasso et al. | 55/228 |
| 5,221,520 | 6/1993 | Cornwell | 422/122 |
| 5,240,595 | 8/1993 | Lamarre | 210/123 |

FIG. 4 ed States: 5,743,944

FLUID CLATHRATE SYSTEM FOR CONTINUOUS REMOVAL OF HEAVY NOBLE GASES FROM MIXTURES OF LIGHTER GASES

This application is a CIP of application Ser. No. 08/192,141, filed Feb. 4, 1994, now abandoned.

This invention was made with government support under Contract No. W-31-109-ENG-38 awarded by the Department of Energy, and the U.S. Government has certain rights in this invention.

The present invention is concerned generally with an apparatus and method for detection and separation of heavy noble gases. More particularly, the invention is concerned with an apparatus and method for separation of heavy noble gases from lighter gas mixtures, particularly air, helium, neon or argon. Further, the invention is concerned with use of particular hydrocarbon-based oils which exhibit a highly selective clathrate effect for heavy noble gases.

Separation and/or detection of heavy noble gases is an important aspect of a variety of technologies including, for example, collection of helium as a raw material resource (uncontaminated with heavy noble gases), removal of radioactive xenon and krypton created at nuclear fuel processing facilities, separation of various noble gases from one another (such as recovery of expensive tag gases in nuclear reactor facilities) and detection of heavy noble gases mixed with other gases. Currently, separation and/or detection of heavy noble gases typically involves costly and inefficient technologies, such as use of cryogenic charcoal adsorption methods.

Such current methodologies of separation and detection of heavy noble gases are so inefficient, expensive and difficult to implement that only large companies or governmental facilities can reasonably afford to operate apparatus or carry out remedial action to detect, separate and/or remove: the heavy noble gases.

In the case of home sites, radon remediation measures involve use of expensive procedures such as soil aeration methods or sealing the home from radon soil gas leaks from the environment. The presence of substantial radon gas in homes and buildings has been determined to be a significant health hazard, but current methods and apparatus for radon mitigation are very costly, and some mitigation methods can give rise to greatly increased heating costs in the winter, as well as greater cooling costs in the summer.

It is, therefore, an object of the invention to provide a novel method and apparatus for detection and/or separation and/or removal of heavy noble gases from a volume of interest.

It is another object of the invention to provide an improved method and apparatus for detection and/or separation of heavy noble gases from air and/or mixtures of lighter gases, such as argon, neon and helium.

It is a further object of the invention to provide a novel method and apparatus for detecting and/or separating heavy noble gases from helium.

It is also an object of the invention to provide an improved method and apparatus for removal of radon from air using certain hydrocarbon-based oils exhibiting a highly selective clathrate effect for heavy noble gases.

It is an additional object of the invention to provide a novel method and apparatus using a bath of corn or soybean oil to absorb heavy noble gases from air and/or light noble gases.

It is yet another object of the invention to provide an improved method and apparatus for absorbing and controllably releasing radon gas from an oil reservoir.

It is still a further object of the invention to provide a novel system for isolation and recovery of radioactive fission gases from a nuclear fuel processing stream, or wasted tag gases from a nuclear fuel gas tagging operation.

It is yet a further object of the invention to provide an improved method and system for removing low, as well as high, concentrations of heavy noble gas from a dynamic gas flow stream.

It is also a further object of the invention to provide a novel method and system for removing radon and other heavy noble gases from air and/or lighter noble gases using hydrocarbon-based oils exhibiting a strong clathrate absorption effect for heavy noble gases in the temperature range from about the oil freezing point to 25° C.

It is yet an additional object of the invention to provide an improved method and apparatus for absorption and controllable release of heavy noble gases which exhibit a highly selective clathrate effect for absorption in the 20° C.–22° C. temperature range and even lower (to oil freezing point) and rapid desorption above about 60° C.

Other advantages and objects of the invention will be apparent from the detailed description and drawings described hereinbelow.

DETAILED DESCRIPTION OF PREFERRED EMBODIMENTS

Figure 1:
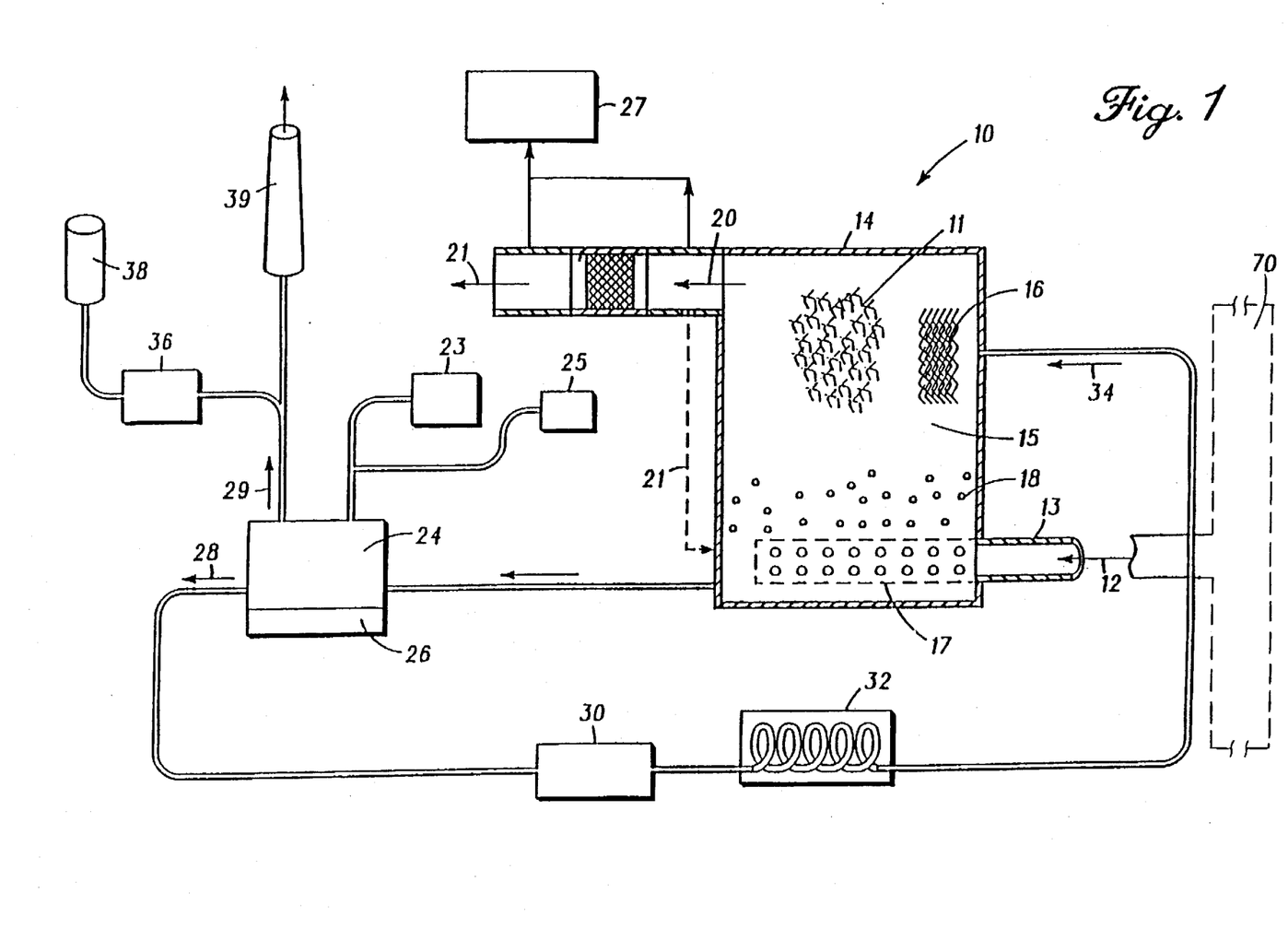
FIG. 1 illustrates an apparatus for removal of radon gas from air.

An apparatus constructed in accordance with one form of the invention is shown generally at 10 in FIG. 1. A gas stream 12 (such as ambient air or any gas from a volume to be treated) which includes a heavy noble gas (such as xenon, krypton and radon) is input via port 13 to reservoir 14 containing an oil 15 or an oil soaked porous means, such as a sponge or cloth mass or other such packing 11 (shown as a fine hatched area in the reservoir 14 in FIG. 1) which is continuously soaked with the oil 15. The packing 11 can in particular be small balls or beads, conventional packed tower rings, saddles or other conventional packing materials for maximizing content of gas and fluid. In one form of the invention the oil 15 can be any commercially available oil, which is a viscous, combustible, water immiscible liquid soluble in organic solvents, such as ether and naphtha and can be of animal, vegetable, mineral or synthetic origin. For example, the oil can be a corn oil, a petroleum based vacuum pump oil, petroleum based motor oil, squalane ($C_{30}H_{62}$), squalene ($C_{30}H_{60}$) or a synthetic vacuum pump oil, such as Halovac (a trademark of Texaco Oil Co.). In a most preferred form of the invention the oil is a vegetable-based oil which exhibits a highly selective clathrate effect for heavy noble gases. Further details on this embodiment are described hereinafter in a section entitled "Clathrate Effect Oils."

In the apparatus 10 the input gas stream 12 is bubbled through the oil 15 or passed through the oil soaked mass 11. In a preferred embodiment of the gas bubbler apparatus 10, the reservoir 14 includes a gas diffuser 17, which serves to form a fine dispersion of gas bubbles 18 from the input gas stream 12. In another embodiment the reservoir 14 can further include a nylon mesh 16 to assist in forming the fine gas bubble dispersion. This fine gas bubble dispersion maximizes gas bubble surface area, thereby accelerating the rate of absorption by the oil 15 of heavy noble gas in the bubbles 18. The gas bubbles 18 rise to the top of the oil containing reservoir 14 and/or exit from the oil soaked mass 11. An output gas stream 20 passes from the reservoir 14, through a vapor trap 22 (to remove condensable oil vapor, if necessary) and into the environment as an exhaust gas 21 with substantial reduction of heavy noble gas therefrom.

In another embodiment, in order to remove further amounts of radon, the gas stream 20 can be recycled one or more times through the reservoir 14 (shown by dotted arrow 21'). As shown in Example II the level of radon absorption by the oil 15 is well in excess of a level of about 500 pCi/liter, which, for the conditions in Example II, is a measure of adequate effectiveness for use in a home or other such application.

Figures 2, 3B, 3C:
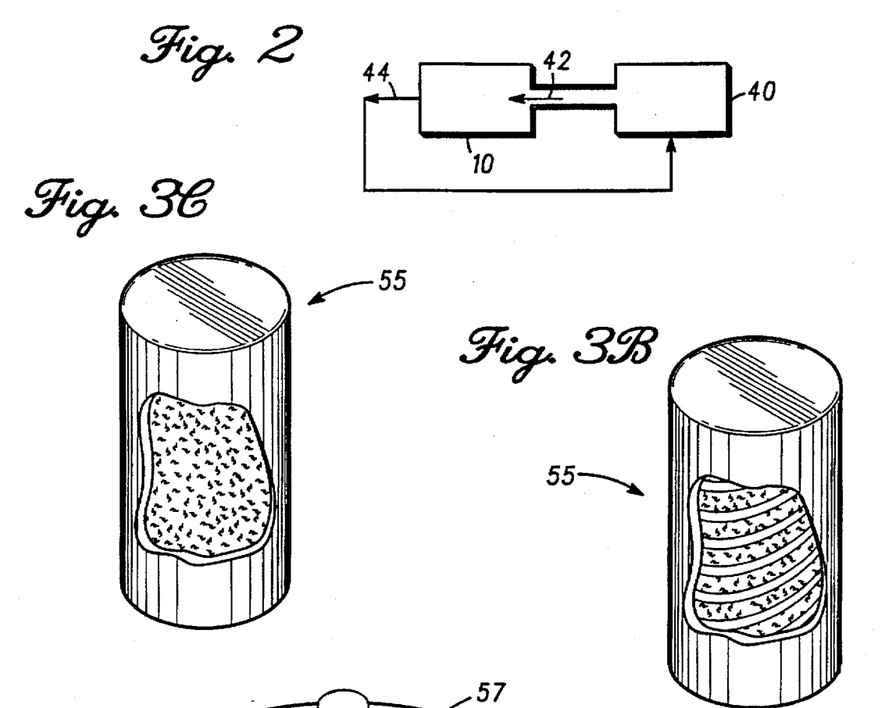
FIG. 2 illustrates a functional flow diagram of a system for removal of radioactive gases from a nuclear materials processing system.
FIG. 3B is a side cutaway view of the chevron separator of FIG. 3A.
FIG. 3C is a front cutaway view of the chevron separator.
Figure 3A:
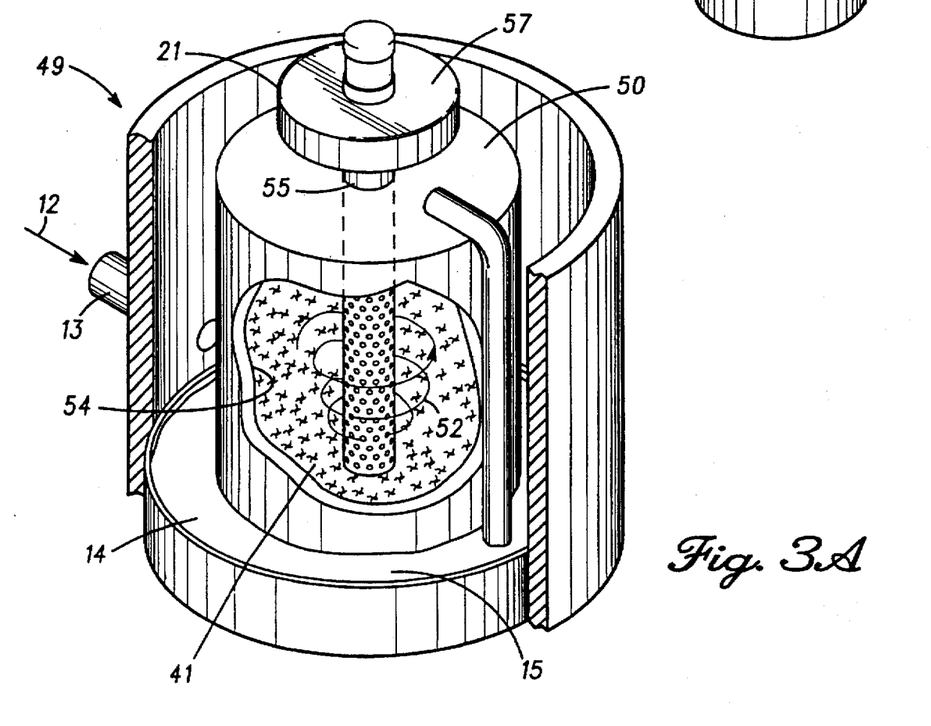
FIG. 3A illustrates a cyclone device with chevron separators for radon gas removal from air.

In another embodiment of the invention shown in FIG. 3, an apparatus 49 includes a modified reservoir 14 wherein is disposed a porous medium, such as a sponge or cloth mass 41. The oil 15 from the reservoir 14 is circulated through the mass 41 by pumping the oil 15 to a top tray 50 and allowing gravity to cause the oil 15 to flow through the porous mass 41. The geometric arrangement of the apparatus 49 would be such as to allow considerably larger volumes of the gas stream 12 to flow through a tortuous and/or a cyclonic path 52 of the apparatus 49 wherein the gas stream 12 contacts walls 54 which consist of the oil soaked mass 41. The gas stream 12 flows along the cyclonic path 52 and then proceeds through chevron separator column 55 (see the top portion in FIGS. 3B and C) and the air is passed out through exhaust gas housing 57 as the exhaust gas 21. This apparatus 49 would allow substantially greater air flows and cause preferential absorption of the heavy noble gases, as they would be unable to execute the turns as easily as the lighter gases and would have an increased probability of collision with the oil soaked walls 54.

In addition, as shown in FIG. 1, the apparatus 10 can generally include means for analyzing the output gas stream 20 and/or the vent gas 21. Thus, a conventional analytical device 27 (shown in phantom in FIG.. 1) which can be used to monitor the effectiveness of the apparatus 10 and the ongoing level of contaminating oil vapor and heavy noble gas in the gas stream 20.

As shown in FIG. 1, the oil 15 is output from the reservoir 14 for removal of the heavy noble gas absorbed by the oil 15. Preferably the oil 15 is continuously output from the reservoir 14, but the output of the oil 15 and subsequent heavy noble gas separation from the oil 15 can also be done batchwise on a periodic basis. The oil 15 is then input to means for removal of the heavy noble gas, such as a device 24 for mechanically agitating the oil 15 and/or a heated reservoir 26. The device 24 for mechanical agitation of the oil 15 can be, for example, a commercial blender, an apparatus for injection of gas bubbles, free from heavy noble gas, into the oil 15 or an ultrasound generator. In certain embodiments, a removed heavy noble gas 29 undergoes quantitative and/or qualitative analysis by means, such as a conventional cryogenic charcoal adsorption/chemical analysis unit 23, or other chemical or radiological analytical device 25 (shown in phantom in FIG. 1).

As noted in the Examples described hereinafter, the use of both heating and mechanical agitation achieves the preferred maximum amount of heavy noble gas removal 29 from the oil 15 and thus yields a recirculated oil 28 having the least amount of absorbed heavy noble gas. This recirculated oil 28 is returned by oil pump 30 for reuse in the reservoir 14. If the oil 15 has been heated for noble gas removal, a radiator 32 can be included in the apparatus 10 to provide a cooled recirculated oil 34 for reintroduction into the reservoir 14 and for reuse to absorb heavy noble gas. For large-scale radon remediation applications (e.g., mines, school buildings, homes and government sites, all of which are shown schematically as volumes of interest 70 in phantom in FIG. 1), mechanical cooling means may be substituted for 32.

The removed heavy noble gas 29 is passed through art in-line vapor trap 36 (to remove condensable vapors) and input to a conventional heavy noble gas trap 38. The trap 38, which can be an evacuated canister or a canister of activated charcoal, is replaced on a periodic basis. In another embodiment the radon can be vented to ambient through stack 39 (shown in phantom in FIG. 1).

In another aspect of the invention shown in FIG. 2, a nuclear processing system 40 (such as fuel recycling station or a nuclear fuel tagging operation) provides a gaseous output stream 42 which contains heavy noble gas contamination. The apparatus 10 described hereinbefore operates on the gaseous output stream 42 to generate a decontaminated gas stream 44 having reduced amounts of heavy noble gas. The heavy noble gas removed by the apparatus 10 is segregated (such as in the heavy noble gas trap 38) for reuse or disposal as desired. The decontaminated gas stream 44 can be reintroduced into the nuclear processing system 40 or otherwise used or disposed of.

Clathrate Effect Oils

In a most preferred form of the invention it has been determined that certain hydrocarbon-based oils are used for absorption of heavy nobles gases by virtue of exhibiting a highly temperature-sensitive clathrate effect. A clathrate is a cage-like molecular structure wherein atoms that are a correct "size" become trapped in the interstitial spaces between larger molecules. Moreover, it has been discovered that the clathrate effect in these particular type of oils exhibits a very sensitive temperature dependence in the narrow temperature range between 20° C. (about room temperature) to 60° C. In this most preferred embodiment the highly selective clathrate effect is exploited for recovery, isolation and removal of heavy noble gases from air or from lighter gases such as nitrogen, hydrogen, oxygen, helium, argon and neon and mixtures thereof.

Experimental results have determined that the holding capacity of oils for radon, xenon and krypton is greater than would be expected from a straight solubility phenomenon on the basis of the chemical properties of either the oil or the noble gases. Moreover, results of carefully controlled experiments have determined that the well-known Henry's Law of gas/fluid solubility cannot explain the highly selective absorption/desorption phenomenon of selected oils for heavy noble gases.

Without expressly limiting the scope of the claims, it is believed that in clathrate materials the heavy noble gas atoms are held in cavities between the long segments of the oil molecule chains. These gases are held in such interstitial spaces as a result of a tight fit which prevents the trapped gas from escaping from the cavity within the oil molecules. A fluid-clathrate complex (i.e., a group of three to four oil molecules enclosing one heavy noble gas atom) is believed to be stabilized by interactions resulting from the polarizability of the heavy noble gases. This cluster (which we may also call an inclusion compound) has a delicate stability at room temperature and moves as a macro-molecular unit within the fluid. Helium, neon and argon atoms are therefore believed to be too small to "fit snugly" and form an inclusion system with the oil molecule. Moreover, it was determined herein that these smaller noble gases do not follow the clathrate observations and are not removable. Similarly, gas enclosure is not observed in a solution of small, nonpolar molecules such as hexane; in such cases a suitable framework capable of forming inclusion systems is not present.

The solubility mechanism and the clathrate inclusion mechanism for heavy noble gases within the oil are mutually synergistic. Since guest atoms in an interstitial space must have proper orientation for inclusion, higher solubility will increase the probability of the gas being present at the place of enclosure. It is this trapping capability, which increases with the molecular size of the gas, which is believed to permit selective collection of krypton, xenon and especially radon (and not helium, neon and argon). The trapped gases can in turn be easily freed from the oil by warming, which disturbs the enclosing structures and allows the heavy noble gas atoms to escape.

It is the sensitive temperature dependence of the clathrate mechanism (or, in a more general sense, other highly selective chemical/physical mechanisms) that provides a basis for the most preferred method and apparatus of the device 10. A drawback of prior art systems is that, to exploit the temperature dependence of straight solubility (the conventional wisdom of noble gas absorption), one must heat and cool a fluid through a rather high temperature range to obtain sufficiently high absorption/desorption efficiencies. In the most preferred embodiment it was determined that selected oils, such as vegetable-based oils, exhibit a fortuitous narrow temperature range (from about the freezing point to 22° C. for absorbtion and above about 60° C. for release for corn and soybean oils) of the clathrate mechanism for recovery, isolation or removal of heavy noble gases from a gas stream. This process can be performed batchwise or continuously.

Evaluations have been performed to determine whether the absorption and desorption of noble gases by the present invention could be explained by Henry's Law, and hence by straight solubility. According to Henry's Law, if one bubbles radon-laden air through a volume of oil, an equilibrium concentration of radon will be attained in the oil. The ratio of the equilibrium concentration in the oil to the concentration in the input air is Henry's Law coefficient for the oil. Also in accordance with Henry's Law, if one were to load up the oil with radon and then bubble clean air through the oil, the concentration in the oil should drop to a new equilibrium level that is proportional to the lower concentration in the air stream. In experiments conducted with nonclathrate fluid solutions containing absorbed radon, it was found that in bubbling a volume of clean air (i.e., air containing no radon) through the solution that is equal to the volume of the solution, approximately 50% of the radon is removed from the solution. This is consistent with the expectations of Henry's Law. Similarly, 99.9% of the radon can be removed from the oil solution by bubbling a volume of air that is ten times the volume of the oil through the oil solution. This general rule applies not only to radon in nonclathrate solutions, but is a well-known concept applied for removing any gaseous solute from a solution when there is no chemical reaction between the gas and the fluid.

Figure 4:
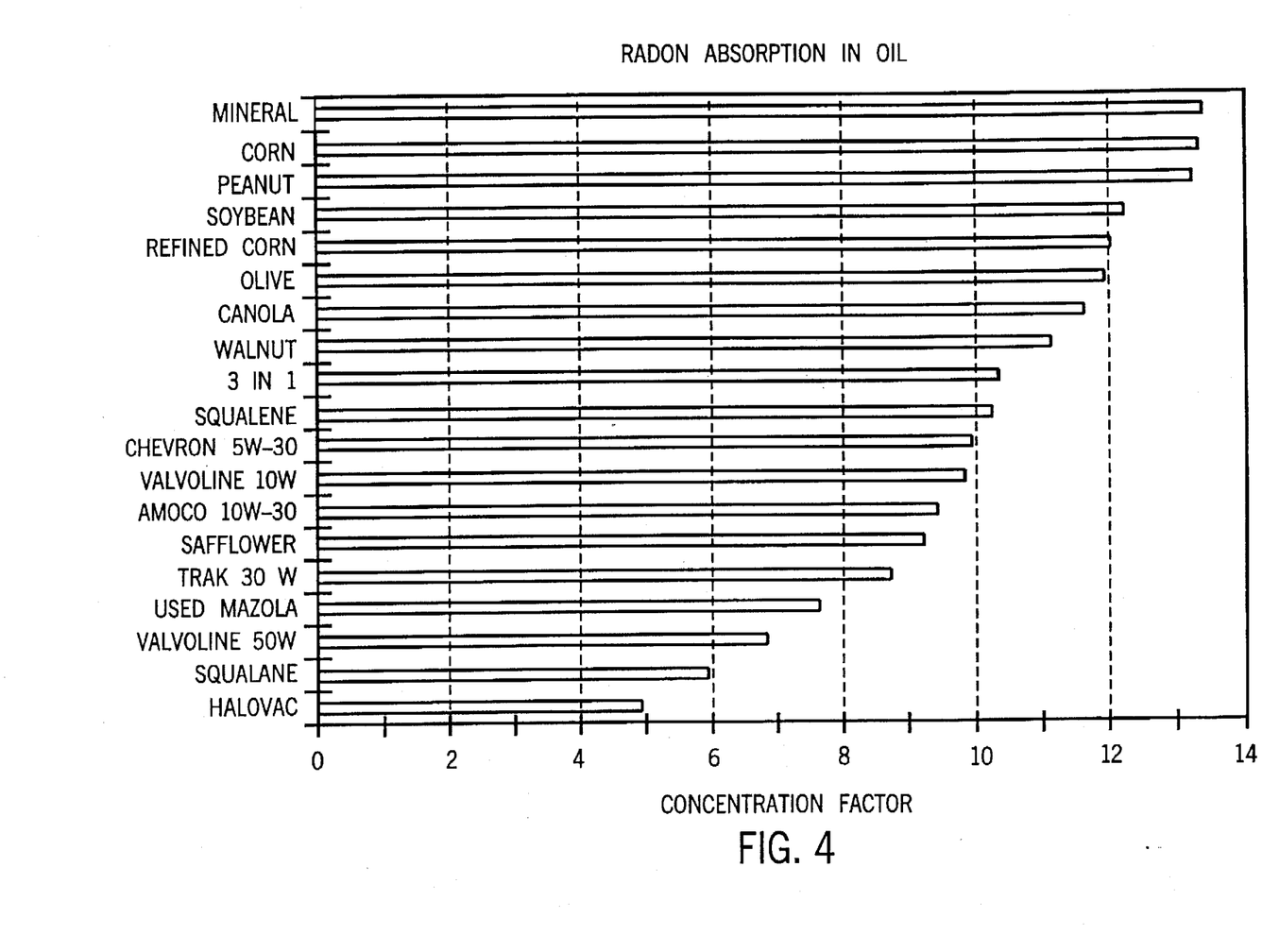
FIG. 4 illustrates radon absorption in various oils.

In experiments performed with radon and various oils (see Example IV and FIG. 4), it has been determined there is a strongly temperature-dependent enhancement to solubility that deviates from Henry's Law. As shown by these experiments, particular hydrocarbon-based oils, such as soybean and corn oil, show highly selective absorption of heavy noble gases. Radon-laden air was bubbled through a sample of oil for a sufficient time that the oil attains radon saturation. A volume of clean air equal to ten times the volume of the oil is bubbled through the radon-oil solution. By measuring the radon remaining in the oil, it was determined that only 93% of the radon was removed from the solution. Since there is no known chemical reaction between an oil and a noble gas, these results can be explained best by the presence of a clathrate effect within the oil. Moreover, the fact that the effect is atomic-size dependent (working only for the heavy noble gases but not for the lighter noble gases) is also consistent with the known behavior of other clathrates. The sensitive temperature dependence of the trapping mechanism provides further confirmatory evidence of such a clathrate effect.

The fact that bubbling removes 93% of the radon from the oil solution does not mean that a proposed clathrate mechanism is responsible for only 7% of the radon trapped in the oil. It is estimated that in a given volume of oil that is saturated with radon, approximately 50% of the radon present is held by the clathrate effect, and the remaining 50% is believed to be held by Van der Walls forces of solubility. The reason that only 7% of the radon remains after bubbling ten volumes of clean air through the oil is that the fluid agitation associated with the bubbling also disrupts the clathrate-cluster mechanism.

For degassing of the oil 15 in the apparatus 10, a sequence of experiments has been conducted which demonstrate that the working fluid can be purged effectively by several methods (see Example IV). These data from Example IV demonstrate that warming of the fluid to only 60° C. rapidly releases greater than 99% of the absorbed noble gas. This makes possible construction of a simple form of the apparatus 10 for continuous concentration where the gas stream 12 and the resulting bubbles 18 pass through the reservoir 14 at room temperature, and the oil 15 is continuously circulated through the reservoir 46 for warming. This very simple and inexpensive mode of operation is possible only because of the fortuitous, sensitive, temperature dependence of the mechanism described above. The output gas stream 20 can be further processed in the manner described in detail hereinbefore including heating the oil 15 in the reservoir 26.

The following nonlimiting examples illustrate various aspects of the invention.

EXAMPLE I

A conventional petroleum-based pump oil (such as mechanical vacuum pump oil, manufactured by Edwards Company, under catalog No. HO19-00-002) for use in vacuum pumps was treated to remove any radon gas contamination by heating for 20 minutes at 80° C. temperature. This cleaned oil was used to fill a container with the oil at ambient temperature, and air was pumped from a basement sump pump reservoir through the oil in the container for a period of seven hours. The concentration of radon in the air was about 60 pCi/liter. A diffuser consisting of a glass frit was present in the container to cause formation of a fine dispersion of air bubbles from the input air. The flow rate of air was 200 ml/minute.

The pump oil exposed to the contaminated air was divided into two samples: (1) a sample agitated by vigorous bubbling with radon-free air for 20 minutes, and (2) a sample both agitated by bubbling and heated for ten minutes at 80° C. The table below illustrates the results obtained from the two samples compared to a control oil sample which was treated to remove radon and not exposed to the air stream potentially containing radon. The remaining radon from the control is believed to arise from the background level of radium present in the oil (naturally occurring radium decays to radon).

| Sample | Gas Removal Method | Radon Removed (pCi) |
| --- | --- | --- |
| 1 (control) | heat and agitation | 2.9 ± 0.08 |
| 2 | agitation only | 194.4 ± 4.0 |
| 3 | heat and agitation | 390.5 ± 8.3 |

EXAMPLE II

The effectiveness of other oils was tested for heavy noble gas removal, and substantially the same test conditions were used as in Example I (time of exposure to air stream and use of clean starting oil). However, the air stream was a controlled gas stream with the radon set at about 190 pCi/liter. The table below summarizes the comparative effectiveness of various oils for radon gas removal. The oil reservoir used in this example held 200 ml of each of the oils listed below.

| Sample | Oil | Gas Removal Method | Radon Removal (pCi/liter) |
| --- | --- | --- | --- |
| 1 (control) | petroleum based pump oil | heat and agitation | 7 |
| 2 | petroleum based pump oil | heat and agitation | 1360 |
| 3 | MAZZOLA ® corn oil | heat and agitation | 1520 |
| 4 | squalane | heat and agitation | 1200 |
| 5 | HALOVAC ® | heat and agitation | 890 |
| 6 | squalene | heat and agitation | 2170 |
| 7 | 10W30 automative oil | heat and agitation | 2030 |

EXAMPLE III

The effectiveness of vacuum pump oil for the absorption of noble gases was concluded from experiments using xenon, krypton, argon, neon and helium gas. In these experiments, mechanical vacuum pump oil (such as described in Example I) works very effectively for the heavier gases (xenon and krypton), but not for the light noble gases (argon, neon and helium). These experiments involved vacuum pumping of the noble gases through a two-stage pumping system comprising a mercury diffusion pump followed by a mechanical vacuum pump containing the pump oil. It was observed in experiments involving radioactive xenon and krypton that the vacuum pump oil would absorb large quantities of the xenon and krypton so that the total gamma radiation of the pump would exceed 3 R/hr at contact. By agitating the oil and heating it slightly, virtually all of the xenon and krypton was driven off such that the radioactivity was reduced in about 5–10 minutes to less than 1 mR/hr.

In experiments involving nonradioactive xenon or krypton gas, the buildup of the xenon and krypton in the vacuum pump oil was determined by monitoring the vacuum levels in the system, measured with an ionization gauge. It was observed that after the source of the xenon and krypton was shut off, the vacuum in the system improved slowly, over a period of 10–25 minutes. This is believed to be the result of saturation of the oil in the mechanical pump with krypton and xenon, which, in turn, created a back pressure in the diffusion pump, which diminishes slowly as the krypton and xenon were gradually released by agitation from the mechanical pump.

However, when this same experiment was conducted with argon, neon or helium, the argon, neon and helium were observed to pass immediately through the mechanical pump to the atmosphere. If the source of the argon, neon or helium is shut off, the vacuum in the system improves immediately, indicating no back pressure in the diffusion pump caused by retention of argon, neon or helium by the mechanical vacuum pump oil.

EXAMPLE IV

Fifty ml of corn oil was saturated with radon by bubbling a controlled source of radon (air containing radon at a level of 200 pCi/l) through the oil for a period of 20 minutes. (Past experiments have demonstrated that saturation in corn oil is attained after only 10 minutes of bubbling). The oil was degassed by bubbling 500 ml of clean air (air which has been passed through a large charcoal bed to remove all trace amounts of radon) through the oil reservoir. The radon remaining in the oil after bubbling with 500 ml of air (i.e., 10 times the volume of the oil) was measured by heating the oil to 80° C. and allowing the radon that is driven off to absorbed on cryogenically cooled charcoal, and subsequently heating the charcoal to drive the radon into a small counting cell (called a Lucas cell). Counting of the Lucas cell revealed that 7% of the original radon remained in the oil after bubbling with 10 volumes of air. In numerous past experiments that have been conducted with radon in non-clathrate liquid solutions, 99.9% of the radon is removed from the solution by bubbling 10 volumes of clean air through the solution. (Thousands of such samples have been routinely degassed by this method in the Radon Research Laboratory over the past 20 years).

While preferred embodiments of the invention have been shown and described, it will be clear to those skilled in the art that various changes and modifications can be made without departing from the invention in its broader aspects as set forth in the claims provided hereinafter.

What is claimed is:

1. A system for separation of a heavy noble gas entrained in a gas stream obtained from surrounding ambient air in an enclosed volume of air breathable by a person, comprising:

means for containing a fluid and having an input port, said means for containing coupled to a volume of air breathable by a person and said means also constructed for receiving a stream of the volume of air and said containing means enabling the stream of the volume of air to be input into said containing means to contact the fluid in said means for containing and be output therefrom;

said fluid in said containing means consisting essentially of an oil and the oil disposed within said containing means with said oil for contacting the stream of the volume of air and also for absorbing a heavy noble gas entrained in the stream of the volume of air; and means coupled to said containing means for receiving said oil therefrom after said oil has absorbed the heavy noble gas and said means for receiving further for desorbing the heavy noble gas from said oil.

2. The system as defined in claim 1 wherein the oil is selected from the group consisting of corn oil and soybean oil and combinations thereof.

3. The system as defined in claim 1 wherein the oil exhibits a clathrate effect for absorption of a heavy noble gas selected from the group consisting of radon, krypton and xenon and in a temperature range of about 20° C. to the freezing point of the oil.

4. The system as defined in claim 1 further including means, coupled to said means for receiving the oil, for receiving desorbed heavy noble gas.

5. The apparatus as defined in claim 1 further including means, coupled to said means for receiving oil, for desorbing heavy noble gas from the oil.

6. The apparatus as defined in claim 3 wherein the oil exhibits a clathrate desorption effect, of the heavy noble gas absorbed by the clathrate effect of the oil, for a temperature range above about 50° C. to 60° C.

7. The apparatus as defined in claim 1 wherein said containing means includes at least one of a diffuser for said gas stream for forming a fine bubble distribution of gas and a packed column scrubber.

8. The apparatus as defined in claim 1 wherein said means for receiving the oil and desorbing the heavy noble gas comprises means for mechanically agitating the oil.

9. The apparatus as defined in claim 1 wherein said means for receiving the oil and desorbing the heavy noble gas comprises means for applying heat to the oil.

10. The apparatus as defined in claim 9 further including means for cooling the oil for return to said containing means.

11. The apparatus as defined in claim 4 wherein said means for receiving the desorbed heavy noble gas comprises a heavy-noble-gas trap.

12. A system for absorption of a heavy noble gas entrained in a gas stream taken from a volume of breathable air in an enclosed space, comprising:

a reservoir coupled to a volume of breathable air in an enclosed space for containing a fluid consisting essentially of a liquid oil, the liquid oil absorbing a heavy noble gas from a first gas stream taken from the volume of breathable air, said reservoir holding the liquid oil and having an input port for receiving the first gas stream from the volume of breathable air and enabling the first gas stream to bubble through the liquid oil in said reservoir; and said reservoir further including an output port through which is passed a second gas stream decontaminated of the heavy noble gas, thereby removing a portion of the heavy noble gas from the first gas stream.

13. The system as defined in claim 12 further including means for desorbing the heavy noble gas absorbed by the oil.

14. The system as defined in claim 13 further including means for trapping the heavy noble gas desorbed from the oil.

15. The system as defined in claim 13 wherein the oil exhibits a clathrate effect for absorption of a heavy noble gas selected from the group consisting of radon, krypton and xenon.

16. The system as defined in claim 15 wherein the oil exhibits a selective clathrate desorption of the heavy noble gas above about 60° C.

17. A system for absorption of a heavy noble gas entrained in a gas stream taken from a volume of breathable air present in an enclosed space which can be occupied by a person, comprising:

a reservoir having an input port coupled to a volume of breathable air in an enclosed space which can be occupied by a person with said reservoir containing a liquid oil, the liquid oil in said reservoir absorbing a heavy noble gas in a gas stream taken from the volume of breathable air with the gas stream passed into said input port and through the liquid oil in said reservoir; and said reservoir further including an output port through which is passed a decontaminated gas stream, thereby removing a portion of the heavy noble gas present in the gas stream taken from the volume of breathable air.

18. The system as defined in claim 17 further including means coupled to said reservoir for desorbing the heavy noble gas from the liquid oil.

19. The system as defined in claim 17 wherein the liquid oil exhibits a clathrate effect for absorption of the heavy noble gas.

20. The system as defined in claim 17 wherein the enclosed space is selected from the group consisting of a home, a mine, a school building and a government site.

* * * * *

UNITED STATES PATENT AND TRADEMARK OFFICE
CERTIFICATE OF CORRECTION

PATENT NO. : 5,743,944
DATED : April 28, 1998
INVENTOR(S) : Gross, et al.

It is certified that error appears in the above-identified patent and that said Letters Patent is hereby corrected as shown below:

In Column 1, line 36, delete the ,colon":" after "remove".
In Column 3, line 45, delete one of the periods "." after ""FIG".
In Column 7, line 35, delete "automative" and insert --automotive--.

Signed and Sealed this

First Day of September, 1998

Attest:

BRUCE LEHMAN

Attesting Officer

Commissioner of Patents and Trademarks